Sept. 21, 1965 W. B. HATCH 3,206,863
ELECTRICAL PICKOFF SYSTEM FOR MAGNETIC COMPASSES
Filed Dec. 18, 1961
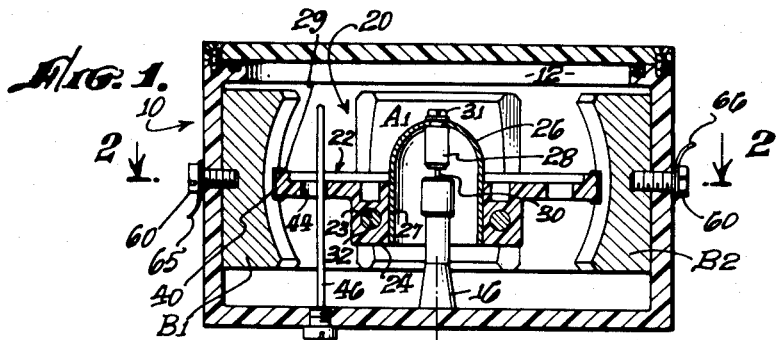
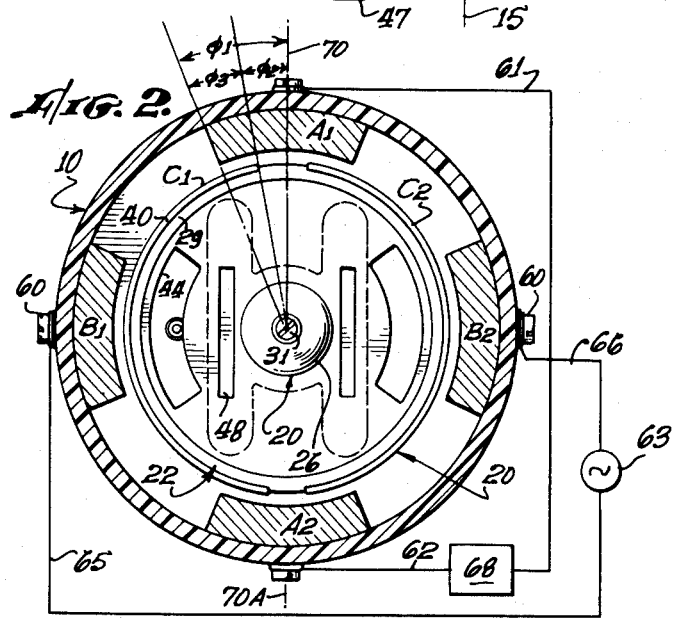
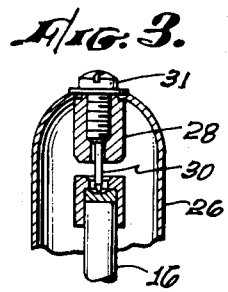
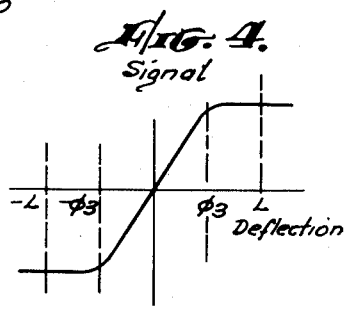
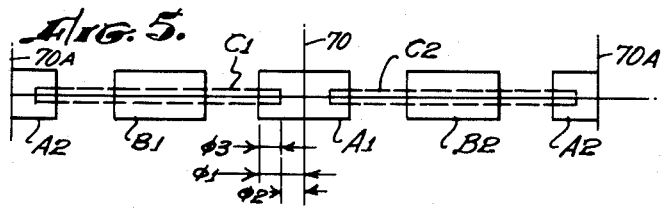
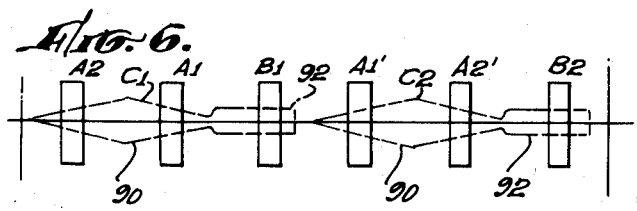
WILLIAM B. HATCH,
INVENTOR.
BY
Barthelow & Lewis

United States Patent Office

3,206,863
Patented Sept. 21, 1965

3,206,863
ELECTRICAL PICKOFF SYSTEM FOR MAGNETIC COMPASSES
William B. Hatch, Santa Barbara, Calif., assignor, by mesne assignments, to Swedlow Inc., Los Angeles, Calif., a corporation of California
Filed Dec. 18, 1961, Ser. No. 160,016
6 Claims. (Cl. 33—223)

This invention has to do with instruments in which the output information is presented in terms of rotary movement of an output element, and relates more particularly to improved means for deriving an electrical signal that represents such movement.

In a magnetic compass, for example, the available directional torque for orienting the compass card is usually small. Hence even very small friction exerted by the pickoff device upon the compass card may cause large errors.

The invention is also particularly suitable for use in connection with instruments that employ a liquid for damping the movement of the output element. In such instruments the invention replaces the more conventional damping fluids by a fluid having limited electrical conductivity, and derives the output signal from the resulting variable resistance between suitably mounted electrodes. Whereas conductive fluids have been used previously in this general manner, the present invention provides improved structure and arrangement of the electrodes, yielding an output signal having greatly improved characteristics.

It is sometimes desirable that the magnitude of the signal be substantially directly proportional to the instrument deflection, at least within an appreciable working range, and the invention is particularly effective in providing such a signal. However, an important advantage of the invention is that substantially any desired non-linear functional relationship may also be provided between the signal magnitude and the deflection. A particularly useful type of non-linear relation provides a substantially linear signal within a limited range on each side of zero, with the signal remaining substantially constant beyond that range. That functional dependence is particularly well suited to control operations such as control of an autopilot system for a boat, for example. The invention permits convenient control of the angular range over which the response is substantially linear.

A further important advantage of the pickoff system of the invention is that it can be used in connection with a magnetic compass, for example, wherein the compass card is mounted for universal rotation about a pivot point. The output signal may then be made responsive only to rotation about an axis that is defined with respect to the case and that is normally vertical. Movement of the compass card about other axes does not affect the signal. That freedom of movement of the compass card relative to the case permits the card to remain horizontal without the need of mounting the case on gimbals.

The invention further provides electrode structure capable of producing a signal of push-pull type, such as is developed by a complete bridge circuit, all arms of the bridge being simultaneously variable for maximum signal amplitude. By utilizing a completely symmetrical bridge arrangement, the pickoff is made far less dependent upon small errors of dimension or balance than is a single-ended type of pickoff, further reducing the possibility of spurious signal components.

A further advantage of the electrode arrangement of the invention is that the inut voltage by which the pickoff is energized appears in full only at diametrically opposite points of the compass chamber, between which there is a relatively long path through the conductive liquid. Nevertheless, by providing a bridge in which all arms are varied, the output signal closely approaches the full input voltage as a maximum value.

A further aspect of the invention utilizes as input or excitation electrodes a pair of electrodes that do not affect the angular response of the instrument. Those input electrodes can therefore be reduced in angular extent without affecting the response characteristics.

A further aspect of the invention utilizes electrode surfaces of novel configuration having an axial dimension that varies with angle about the axis. Such variations may provide the entire dependence of inter-electrode resistance upon compass angle; or may be utilized to modify a normally linear dependence. In that way a wide variety of nonlinear response characteristics may be obtained.

Another aspect of the invention provides particularly economical and effective unitary structure for the compass card of a magnetic compass or the like, facilitating construction and assembly of the compass card and permitting convenient adjustment of its balance and position. This and other advantages are attained by molding the main element of the compass card of a suitable foamed plastic. The buoyancy of the card is then distributed throughout its structure, and the troublesome and expensive construction and assembly of special float elements are entirely avoided. Moreover, failure through leakage of a hollow float chamber cannot occur. The invention also includes improved means for mounting upon the card structure such elements as the pivot and orienting magnets.

The invention further provides improved stop means for limiting the movement of the compass card to a desired angular range without possibility of damage to the card itself or to the pivot structure.

A full understanding of the invention and of its further objects and advantages will be had from the following description of an illustrative manner of carrying it out. The particulars of that description, of which the accompanying drawings form a part, are intended only as illustration, and not as a limitation upon the scope of the invention, which is defined in the appended claims.

In the drawings:

FIG. 1 is a vertical axial section representing an illustrative embodiment of the invention;

FIG. 2 is a horizontal section one line 2—2 of FIG. 1 including a schematic wiring diagram;

FIG. 3 is a detail of FIG. 1 at enlarged scale;

FIG. 4 is a graph illustrating a typical angle dependence of the output signal in accordance with the invention;

FIG. 5 is a schematic development of the electrode structure of FIG. 2; and

FIG. 6 is a schematic development of electrode structure, representing a modification.

As shown schematically in FIGS. 1 to 3 and 5, the compass bowl 10 with normally vertical axis 15 encloses a compass chamber 12 adapted to be filled with a liquid of limited electric conductivity, such for example as an electrolyte.

The compass card, indicated generally at 20, comprises a unitary float member 22 of generally flat disk form with a downwardly extending boss 24 that is generally circular with four parallel arms 25, as shown in dotted lines in FIG. 2. Two bores 23 in those arms receive the cylindrical bar magnets 32 in mutually parallel and normally horizontal position symmetrically on opposite sides of the card axis. An axial aperture 27 in float member 22 is so dimensioned as to receive by a light press fit a metal support 26 of inverted cup form on which a pivot carrier 28 is mounted. The pivot pin 30 is typically formed integrally with a screw 31 which is threaded coaxially in carrier 28, as shown best in FIG. 3. The weight of magnets 32 causes them to act as stabilizing means to maintain disk 22 normally in a horizontal plane; and their magnetization causes them to act as orienting means to rotate the disk about pivot 30 in response to the earth's magnetic field. Many conventional features of such compass structure, such as an air chamber to accommodate expansion of the liquid in chamber 12, for example, which are not directly involved in the present invention, are omitted from the drawings for clarity of illustration.

Pivot pin 30 is supported on a fixed concave jewel bearing, which is retained by an inwardly flanged sleeve on the upper end of a coaxial post 16. Post 16 is preferably formed integrally with the bottom portion of bowl 10. The periphery of compass card 20 may be flanged for stiffness, as at 29, forming a cylindrical edge surface of any desired axial width. That edge carries electrode structure 40, to be more fully described. The parts are so dimensioned that the point of pivot 30 lies substantially in the median plane of that electrode structure.

Stop means of improved type are provided to limit the rotation of the compass card to a definite angular range on each side of a zero position. The two circumferential slots 44 are preferably formed on opposite sides of the float axis, extending through angles equal to the desired deflection range. The stop pin 46 is mounted on the chamber wall and projects parallel to axis 15 through one of the slots 44 in spaced relation to its longitudinal walls. Stop pin 46 comprises a relatively long and resiliently flexible straight wire. It is typically mounted at one end coaxially on the screw 47, which is set in sealing relation in a threaded hole in the bottom of bowl 10. The width of the slots 44 is sufficient to accommodate swinging movement of the float about pivot 30 in the plane of FIG. 1. The resilient flexibility of stop wire 46 between mounting screw 47 and card slot 44 is sufficient to prevent any sudden shock to the float or pivot as the end of slot 44 engages the stop.

In accordance with one aspect of the invention, float member 22 is molded of a foamed plastic, such as a polymerized synthetic resin, for example, having a density appreciably less than that of the liquid in compass chamber 12. The density of such foamed plastic which may typically comprise polystyrene, is closely controllable in known manner during the molding process. The total volume of foamed material is accurately determined by the detailed design. For example, the channels 48 may be formed in the upper face of the float, reducing its volume and hence its buoyancy to an accurately calculable value. The volume and density of the foamed plastic float structure are selected, with attention to the weight of the metal parts of the card assembly and to the density of the surrounding fluid, that a large fraction, typically about $9/10$, of the total weight of the float assembly is buoyantly supported by the liquid, only the remaining fraction, such as $1/10$, requiring support by pivot 30.

Dome 26 and magnets 32 may be molded in place in the body of the float. A preferred construction, however, is to form the axial aperture 27 and the bores 23 during the molding process, so dimensioned that dome 26 and magnets 32 can be lightly pressed into place and are retained securely by friction. A great advantage of that method of mounting is that the metal parts can be adjusted in longitudinal position at any stage of the assembly, as to obtain accurate balance and position of the compass card on its pivot. At the same time, the structure is effectively rigid in use. The possibility of damage from corrosion is effectively eliminated by the relatively long path through the conductive fluid between the various metal parts. Assembly of the parts is simpler and more economical than in previously known structures.

In accordance with the present invention, an electrical signal representing the rotational position of card 20 relative to bowl 10 is developed with the aid of cooperating electrode means mounted on the card and in fixed relation to the bowl. An important feature of that electrode structure is its symmetry with respect to pivot axis 15.

In the preferred illustrative form of the invention shown in FIGS. 1 to 3 and 5, the fixed electrode means comprise four distinct electrode elements which are mounted as by the screws 60, at uniform angular spacing from each other about the periphery of the chamber. Two of those electrodes, designated A1 and A2, are spaced symmetrically with respect to the axial plane of FIG. 1; and the other two electrodes B1 and B2 are similarly placed with respect to the plane indicated at 70-70A in FIG. 2. In the present embodiment chamber electrodes B1 and B2 are employed as input electrodes, and are connected via means indicated schematically at 65 and 66 to a source of electrical power represented schematically at 63 (FIG. 2). That power is represented as alternating current, but may be direct current if preferred, provided suitable precautions are taken to prevent electrolytic dissociation of the electrodes or the electrolyte in the chamber. The other two fixed electrodes A1 and A2 are employed as output electrodes, and are connected, as by the wires 61 and 62, to a signal utilization mechanism indicated schematically at 68. Mechanism 68 may include means for amplifying the signal received over lines 61 and 62, and typically may represent a compass repeater which indicates at a remote location the position of compass card 20. Alternatively, mechanism 68 may, for example, comprise an entire autopilot system, which controls the steering mechanism of a craft such as a boat in such a way as to maintain it on a predetermined course. Since such mechanisms may be of conventional type, it is unnecessary to describe them in detail here.

In the present embodiment, the electrode means carried by compass card 20 comprise two distinct arcuate electrode elements, which are electrically insulated from each other except, of course, for the limited conduction through the surrounding liquid. Those card electrodes are designated C1 and C2. They are symmetrically placed with respect to pivot bearing 30 and to the axial plane indicated at 70-70A. The card electrodes may comprise light strips of a suitable metal cemented to the periphery of float 22. Such strips may be formed with upper and lower flanges suitably spaced to frictionally grip the float edge. Alternatively, a metallic film may be formed directly on the edge surface of the card, as by evaporation in vacuum, for example, or by known chemical deposition procedures. Production of the card electrode structures on the insulative body of the card float is greatly facilitated by the fact that no electrical connection to these electrodes is required.

In normal, or zero, position of the compass card, its axial plane 70-70A bisects the two output electrodes A1 and A2, as shown in FIG. 2. Each of the latter electrodes extends through an angle $\phi_1$ on each side of that zero plane. The angular spacing between adjacent ends of the respective card electrodes C1 and C2 is designated $2\phi_2$. The ends of those card electrodes are therefore located at an angle $\phi_2$ from plane 70-70A, and overlap electrodes A1 and A2 by equal angles $\phi_3 = \phi_1 - \phi_2$ in zero position of the card, as indicated in FIG. 2. Card electrodes C1 and C2 are radially spaced from the arcuate working surfaces of chamber electrodes A and B by a distance that is typically small compared to the circumferential distance corresponding to the angle $\phi_3$, just described. That distance may be different for chamber electrodes A and B. It is selected with due regard for both the electrical conductivity across the intervening liquid and for the damping action of the liquid upon the card movement.

The circumferential or angular extent of chamber electrodes B1 and B2 is equal to that for the input electrodes in the present embodiment. Whereas that relation is particularly favorable, the dimensions of the electrodes B1 and B2 are not particularly critical and many advantages of the invention can be obtained with such electrodes either larger or smaller than those shown. It is desirable, however, that the angular spacing between input and output electrodes be large enough to reduce the currents that flow directly between those electrodes to a negligible value compared to the currents flowing between the input electrodes and the directly opposing faces of the card electrodes.

The relatively high conductivity within each of the card electrodes causes essentially the entire input voltage to appear across the liquid paths formed between the chamber electrodes and the directly opposing portions of the card electrodes. The paths between the two card electrodes and the respective input electrodes B1 and B2 are equal in all card positions permitted by stop 46. And in zero position of the card, all of the liquid paths at output electrodes A1 and A2 have the same sectional area, corresponding to angle $\phi_3$. Hence the resistances of those paths are equal. Both output electrodes are then maintained, by voltage dividing action, at equal potentials half way between the potentials of B1 and B2. The signal on lines 61 and 62 is then zero.

If card 20 is deflected slightly from zero, say counterclockwise as seen in FIG. 2, the area of the directly opposing portions of A1 and C1 decreases, while that of A1 and C2 increases. The resistances of those liquid paths change in inverse proportion to those areas. Hence the potential of A1 is shifted to a value nearer that of B1 than that of B2. In similar manner, the potential of output electrode A2 approaches that of B2. The resulting difference in potential between A1 and A2 appears as an output signal on lines 61 and 62. One of those lines is raised in potential and the other lowered with respect to the zero signal condition, providing a signal of push-pull type to device 68. Opposite rotation of card 20 produces a signal of opposite polarity, or, in the case of alternating current excitation, of opposite phase with relation to the reference voltage.

As the card deflection increases, the output signal increases correspondingly, and, in the present embodiment, substantially linearly, until the deflection from zero reaches the value $\phi_3$ (FIG. 4). At that position, the resistance between electrodes A1 and C1, for example, is already very large compared to that between A1 and C2. Hence the potential of A1 is virtually equal to that of C2, and the output signal is virtually the entire voltage that is communicated from the input electrodes to C1 and C2. Beyond $\phi_3$, increasing deflection causes the resistance between A1 and C1 to increase rapidly and that between A1 and C2 to decrease appreciably until C2 overlaps the whole of A1 at a deflection of $\phi_1+\phi_2$. However, that does not ordinarily increase the output signal appreciably. Hence the output signal remains essentially constant from deflection $\phi_3$ all the way to the deflection $90°-\phi_3$. Beyond that point the upper end of C2, for example, starts to overlap input electrode B1, thereby reducing significantly the voltage difference between C1 and C2 and correspondingly reducing the output signal.

In order to avoid possible ambiguity as to the meaning of the output signal, it is convenient to limit deflection of the compass card to an angle less than $90°-\phi_3$, as by stop means such as those already described. Since the output signal is essentially constant for deflections from about $\phi_3$ to about $90°-\phi_3$, the stop may be arranged to act at any desired point within that range. However, it is desirable to permit free movement of the card appreciably beyond $\phi_3$ on each side of zero, for example to a position such as L in FIG. 4. Any tendency of the card to oscillate after striking the stop then causes no appreciable change in the signal.

As shown best in FIG. 1, the radially inner faces of the chamber electrodes are preferably spherically curved concentrically with respect to pivot point 30. Swinging movement of the compass card about a transverse axis then does not affect the signal, and it is ordinarily unnecessary to provide a gimbal mount for the compass bowl.

As the plane of symmetry 70–70A of the compass card sweeps across chamber electrodes B, the output signal repeats essentially the same behavior represented in FIG. 4, but with opposite polarity. In fact, either pair of chamber electrodes may be employed as input electrodes, and the other pair as output electrodes. The preferred arrangement shown, however, has the advantage that circumferential or angular dimension of the input electrodes may be selected arbitrarily to provide the desired input impedance characteristics and damping action without affecting the output characteristics of the transducer, as typically portrayed in FIG. 4. For example, it is often advantageous to make the circumferential dimension of input electrodes B1 and B2 appreciably smaller than that illustrated, thereby reducing the leakage current that flows between those electrodes via paths that do not include the card electrodes.

FIG. 5 represents a schematic development of the opposing working faces of the electrodes in zero position of the card, with axial plane 70–70A indicated. For clarity of illustration, the chamber electrodes A and B are shown in solid lines and the card electrodes C1 and C2 in dashed lines.

FIG. 6 corresponds to FIG. 5, but illustrates another aspect of the invention, whereby resistance between radially opposing electrodes varies with card deflection due to variation of the axial dimension of the opposing areas, rather than variation of the circumferential dimension, as in FIG. 5. As shown in FIG. 6, each of the card electrodes C1 and C2 comprises a working portion 90 of diamond shape and a transmitting portion 92 of rectangular shape. Two chamber electrodes, indicated at B1 and B2, substantially bisect rectangular portions 92 of the respective card electrodes in zero position of the card, as shown, and form one set. Another set comprises two electrode structures, each of which is divided into two circumferentially spaced elements which are electrically connected together. The electrode elements A1 and A1', for example, correspond functionally to the single electrode A1 of FIG. 5. They substantially bisect oppositely oblique halves of the respective diamond portions 90 of the card electrodes. Similarly, the two elements A2 and A2' bisect the two remaining oblique halves of the diamond portions, and correspond functionally to electrode A2 of FIG. 5.

With that illustrative arrangement, it will be seen that in zero position of the card all four electrode elements A oppose equal areas of card electrodes. Either set of chamber electrodes may be used as input electrodes and the other as output electrodes. For example, with one input terminal connected to A1 and A1' and the other connected to A2 and A2', the two card electrodes are held at equal intermediate potentials. Those potentials are transferred across the rectangular gaps to electrodes B1 and B2, from which output lines are connected to a signal utilization device such as 68 to FIG. 2. Alternatively, excitation power may be supplied to electrodes B1 and B2 of FIG. 6, and the output signal taken from two lines, one connected to A1 and A1' and the other to A2 and A2'. As the card rotates from zero position the card electrode potentials shift in opposite directions. The effective angular working range of an arrangement such as that of FIG. 6 corresponds essentially to half the circumferential dimension of each of the diamond formations 90. Stop means, such, for example, as the stop structure already described, are preferably provided to limit the card movement to substantially that range.

The particular arrangement shown in FIG. 6 is illustrative of many configurations that produce continuously variable signals by virtue of variable axial electrode dimensions. When the electrode edges of formation 90 are rectilinear, as shown, the signal typically varies substantially linearly with the deflection angle of the card. By varying the shape of those electrode edges, substantially any desired type of non-linear response can be obtained.

I claim:

1. A signal generating compass comprising in combination structure forming a compass chamber having a normally vertical pivot axis and adapted to contain a liquid of limited electric conductivity,
   a compass card having a card axis and mounted within the chamber for rotation about at least a point common to the pivot axis and the card axis through a working range that includes a zero position, said compass card comprising orienting magnet means and two arcuate card electrode means,
   a first pair of arcuate chamber electrode means fixedly mounted in the chamber coaxially of the pivot axis and mutually angularly spaced in symmetrical relation with respect to a plane containing the pivot axis,
   said two card electrode means being mutually insulated and mounted in diametrically opposite positions with respect to the card axis and spaced radially from the chamber electrode means, each chamber electrode means in zero position of the card overlapping equal portions of the respective card electrode means, card rotation from zero position causing one chamber electrode means to overlap more of one card electrode means and less of the other card electrode means,
   a second pair of chamber electrode means fixedly mounted in the chamber coaxially of the pivot axis and spacedly opposed to substantially equal portions of the respective card electrode means in all rotational card positions within the working range,
   means for supplying electric power to one pair of chamber electrode means,
   and circuit means responsive to voltage differences between the other pair of chamber electrode means.

2. A signal generating compass comprising in combination
   structure forming a compass chamber having a normally vertical axis and adapted to contain a liquid of limited electric conductivity,
   a compass card mounted within the chamber for rotation about at least a point on said axis and comprising orienting magnet means and card electrode means,
   a pair of input chamber electrodes mounted in the chamber on opposite sides of the axis,
   a pair of output chamber electrodes mounted in the chamber on opposite sides of the axis and intermediate the input electrodes,
   said card electrode means comprising two mutually insulated arcuate electrodes spaced radially from the chamber electrodes and symmetrically spaced with respect to a card diameter which bisects the electrodes of one pair of said chamber electrodes in zero position of the card,
   the opposite end portions of each card electrode overlapping the respective chamber electrodes of said one pair of chamber electrodes by equal angles in zero position of the card,
   means for supplying electric power to the input electrodes,
   and circuit means responsive to voltage differences between the output electrodes.

3. A signal generating compass comprising in combination
   structure forming a compass chamber having a normally vertical axis and adapted to contain a liquid of limited electric conductivity,
   a compass card mounted within the chamber for rotation about at least a point on said axis and comprising orienting magnet means and card electrode means,
   a pair of input chamber electrodes mounted in the chamber on opposite sides of the axis,
   a pair of output chamber electrodes mounted in the chamber on opposite sides of the axis and intermediate the input electrodes,
   said card electrode means comprising two mutually insulated arcuate electrodes spaced radially from the chamber electrodes and symmetrically spaced with respect to a card diameter which bisects the output electrodes in zero position of the card,
   the opposite ends of each card electrode overlapping the respective output electrodes by equal angles in zero position of the card,
   means for supplying electric power to the input electrodes,
   and circuit means responsive to voltage differences between the output electrodes.

4. A signal generating compass, comprising in combination
   structure forming a compass chamber adapted to contain a liquid of limited electric conductivity,
   a compass card assembly mounted within the chamber for rotation about a center of rotation fixed with respect to the chamber, said compass card comprising orienting magnet means and two mutually insulated arcuate card electrodes mounted coaxially of the center of rotation and angularly spaced from each other on opposite sides thereof,
   a first pair of chamber electrodes mounted in the chamber with concave arcuate electrode surfaces positioned symmetrically on opposite sides of the center of rotation,
   a second pair of chamber electrodes mounted in the chamber with concave arcuate electrode surfaces positioned symmetrically on opposite sides of the center of rotation and angularly spaced between the electrode surfaces of the first pair of chamber electrodes, said chamber electrode surfaces being relatively closely spaced radially from the card electrodes,
   the chamber electrode surfaces of one pair bridging the respective spaces between the card electrodes and overlapping the adjacent end portions thereof for equal angular distances in zero position of the compass,
   means for supplying electric power to one pair of chamber electrodes,
   circuit means responsive to the voltage difference between the other pair of chamber electrodes, said voltage difference increasing continuously with compass deflection from zero to a first angle substantially equal to said angular distances and remaining substantially constant with further deflection to a second angle substantially equal to the complement of said first angle,
   and stop means acting to limit said deflection of the compass card assembly to a definite angle which is larger than the first angle and is less than the second angle.

5. A signal generating compass comprising in combination
   structure forming a compass chamber adapted to contain a liquid of limited electric conductivity,
   a compass card assembly mounted within the chamber for rotation through an effective working range and comprising orienting magnet means and circumferentially extending card electrode means,
   chamber electrode means fixedly mounted in the chamber and radially spaced from the card electrode means, portions of the chamber electrode means and of the card electrode means being mutually opposed,
   one of said electrode means having an angular portion wherein its axial dimension varies continuously in a circumferential direction,
   the other electrode means having a boundary that traverses the entire axial dimension of said one electrode means within said angular portion substantially throughout said effective working range of the card rotation, and means responsive to variations in the electrical resistance between said chamber and card electrode means produced by rotation of the card assembly.

6. A signal generating compass comprising in combination structure forming a compass chamber adapted to contain a liquid of limited electric conductivity, a compass card assembly mounted within the chamber for rotation through a working range and comprising orienting magnet means and circumferentially extending card electrode means, chamber electrode means fixedly mounted in the chamber and radially spaced from the card electrode means, portions of the chamber electrode means and of the card electrode means being mutually opposed, one of said electrode means including two electrode portions within which the axial dimension varies continuously and oppositely with varying circumferential position, the other electrode means including two axially elongated electrodes mounted opposite the respective said electrode portions and extending axially beyond the maximum axial dimensions of those portions, and means responsive to variations in the electrical resistance between said chamber and card electrode means produced by rotation of the card assembly.

References Cited by the Examiner

UNITED STATES PATENTS

| 1,702,405 | 2/29  | Holmes         | 340—201    |
| 1,932,329 | 10/33 | Urfer          | 33—204.64  |
| 2,067,467 | 1/37  | Urfer          | 338—32     |
| 2,089,987 | 8/37  | Urfer          | 33—223     |
| 2,111,442 | 3/38  | West           | 33—223     |
| 3,350,402 | 6/44  | Krasnow et al. | 33—223     |
| 2,765,541 | 10/56 | Story          | 33—223     |
| 2,961,592 | 11/60 | Ware           | 318—489    |

FOREIGN PATENTS 116,787   4/43   Australia.

ISAAC LISANN, *Primary Examiner.*

LEYLAND M. MARTIN, *Examiner.*